(12) United States Patent
Youngner

(10) Patent No.: US 6,378,292 B1
(45) Date of Patent: Apr. 30, 2002

(54) MEMS MICROTHRUSTER ARRAY

(75) Inventor: Daniel W. Youngner, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 29 days.

(21) Appl. No.: 09/709,107

(22) Filed: Nov. 10, 2000

(51) Int. Cl.$^7$ .............................. F02K 9/42; F02K 9/44; F02K 9/95; F02K 9/76
(52) U.S. Cl. .............................. 60/224; 60/225; 60/250; 60/257; 60/39.823; 244/169
(58) Field of Search .......................... 60/224, 225, 250, 60/257, 39.823; 244/169, 172

(56) References Cited

U.S. PATENT DOCUMENTS

| | | |
|---|---|---|
| 5,456,429 A | 10/1995 | Mayersak |
| 5,600,148 A | 2/1997 | Cole et al. |
| 5,836,150 A * | 11/1998 | Garcia .......................... 60/251 |
| 6,046,485 A * | 4/2000 | Cole et al. ................... 257/332 |
| 6,102,530 A * | 8/2000 | Kim et al. ...................... 347/65 |
| 6,247,485 B1 | 6/2001 | Rossi et al. |

OTHER PUBLICATIONS http://www.spie.org/web/oer/august/aug98/sunny.html, "Pyrotechnic Materials Ingetrate with Micromachined Silicon to Produce Space Probes", dated Aug. 1998, 3 pages.
http://www.design.caltech.edu/micropropulsion/sunday–times.html, "Jet Engines Smaller Than Penny Will Propel Satellite", by Mark Prigg, The Sunday Times, London, Business Section, dated Sep. 5, 1999, 3 pages.
David H. Lewis,Jr., Siegfried W. Janson, Ronald B Cohen & Erik K. Antonsson, "Digital Micro Propulsion", 7 pages, 12$^{th}$ IEEE International Micro Electro Mechanical Systems Conference Jan. 17–21, 1999.
http://www.design.caltech.edu/micropropulsion/sciam1198/1198techbus4.html, "Little Bangs", Scientific American, Nov. 1998, printed Oct. 12, 2000.
http://www.design.caltech.edu/micropropulsion/tr199910/index.html, "May the Micro Force Be With You", By Ivan Amato, Sep./Oct. 1999, printed Oct. 12, 2000.
http://www.design.caltech.edu/micropropulsion/business–week/index.html, "Pint Size Satellites will Soon Be Doing Giant Jobs", Business Week Online Daily Briefing, Feb. 10, 2000, printed Oct. 12, 2000.
http://www.design.caltech.edu/micropropulsion/, DARPA/MTO/MEMS Digital Micro–Propulsion Project, printed Oct. 12, 2000.
http://www.design.caltech.edu/micropropulsion/Dpchip2jpg.html, Digital Micro–Thruster Chip, printed Oct. 12, 2000.
David H. Lewis,Jr., Siegfried W. Janson, Ronald B Cohen & Erik K. Antonsson, digital Micro Propulsion, pp. 1–34, Apr. 2000.
Younger, Lu, Choueiri, Neidert, Black, Graham, Fahey, Lucus, & Zhu, MEMS Mega–pixel Micro–truster Arrays for Small Satellite Stationkeeping AFOSR Contract #F44620–99–C–0012, Proceedings 14$^{th}$ Annual Small Satellite Conference, Aug. 21–24, 2000.

* cited by examiner

Primary Examiner—Ted Kim
(74) Attorney, Agent, or Firm—Kris T. Fredrick

(57) ABSTRACT

A microelectrical mechanical system (MEMS) microthruster array is disclosed. The MEMS microthruster array of the present invention can be used for maintaining inter satellite distance in small satellites. One microthruster array includes numerous microthruster propulsion cells, each having a vacuum enclosed explosive igniter disposed on one side by a breakable diaphragm and having a propellant-filled chamber on the opposite side of the diaphragm. Upon explosion of the explosive igniter, the first diaphragm breaks, which, together with the explosion of the explosive igniter, causes the propellant to expand rapidly, thereby providing exhaust gases which are ejected from an exterior face of the microthruster propulsion array, thereby providing a small unit of thrust.

20 Claims, 3 Drawing Sheets

MEMS MICROTHRUSTER ARRAY

This invention was made with Government support under Air Force contract number N00014-94-C-01115. The Government has certain rights in the invention.

FIELD OF THE INVENTION

The present invention is related generally to micro electrical mechanical systems (MEMS). More specifically, the present invention is related to MEMS based microthruster arrays which find one application in satellite propulsion.

BACKGROUND OF THE INVENTION

Satellites orbiting the earth range in size from Sputnik to the Hubble Space Telescope and beyond. Attitude maintenance control has typically been carried out using conventional attitude control thrusters, for example, controllable compressed gas release thrusters. There has been interest in replacing single, large satellites with clusters of small satellites. Each satellite in a cluster may be as small as a deck of playing cards, but collectively the cluster could function as a single satellite having the diameter of the cluster. Building a cluster of small satellites may be cheaper and more versatile than building a single large satellite. In particular, one application may include arranging a number of small satellites as a sparse aperture radio wave antenna for imaging distant objects. Sparsely positioned small satellites may also function as different elements of an interferometer having a large aperture.

One difficulty with using numerous small satellites is controlling the inter satellite distance accurately. The satellite-to-satellite distance is preferably maintained within limits for many applications. Small satellites may require a very small rocket motor for maintaining the inter satellite distance.

Very small rocket motors have been difficult to design and/or manufacture. One proposed design uses cold gas thrusters, which can operate by opening gas valves intermittently. This requires a moderate amount of hardware, tubing, and valves, which are often difficult to scale down and do not scale down far enough to be of use in very small satellites. Digital propulsion rocket chips have been proposed and<e prototypes designed. Some prototypes have arrays of individually addressable explosive pixels. Existing designs have drawbacks. One current problem is thermal fratricide.

Thermal fratricide presents at least two problems. First, an individually addressable and ignitable explosive element in an array requires ignition. Ignition typically requires heating an igniter element to a temperature sufficient to cause an explosion of a material disposed close to the igniter. As the igniter temperature increases, heat may be dissipated away from the igniter element, preventing the element from ever approaching a temperature sufficient to cause the explosion or combustion of a propellant or explosive. Many times, the igniter does generate sufficient heat, which is retained, causing the propellant to explode or vaporize. When the temperature is sufficiently high, the heat may be conducted into adjacent individually selectable and ignitable elements, causing them to explode as well. This thermal fratricide thus can cause the explosion of pixels adjacent to the pixel for which the only explosion is desired.

What would be desirable is a microthruster array which provides for individually addressable and selectable microthrusters that do not cause the unwanted ignition of adjacent microthruster cells.

SUMMARY OF THE INVENTION

The present invention provides a MEMS microthruster including a plurality of propulsion cells, wherein the propulsion cells can be deployed in an array, each cell being individually addressable and ignitable. In one embodiment, each propulsion cell has a first cavity having an explosive igniter disposed, and preferably suspended within the first cavity, and a second cavity separated from the first cavity by a first diaphragm. The first diaphragm is preferably cooperatively dimensioned together with the igniter to break the diaphragm after the explosion of the explosive igniter. In one embodiment, a propellant is disposed within the second cavity, where the second cavity is disposed on the opposite side of the first diaphragm from the first cavity. Upon the breakage of the first diaphragm, the propellant can expand rapidly in response to the igniter exploding through the first diaphragm, thereby causing the rapid expansion of the propellant within, and ultimately out of, the second cavity. In. a preferred microthruster cell, the explosive igniter is suspended within the first cavity, and substantially surrounded by a thermal insulator such as a vacuum. The individual propulsion cells are preferably individually selectable and ignitable.

In one embodiment, the propellant is provided as a single component disposed within the second cavity, and can be a plastic explosive such as a nitrocellulose or nitrocellulose acetate. In another embodiment, the propellant is provided as two components. The first propellant component can be a fuel and the second propellant component can be an oxidizer. The second cavity in this embodiment can be divided into a first portion and a second portion, separated therebetween by a second diaphragm. The first diaphragm can be broken by the explosive igniter which also breaks the second diaphragm, thereby causing mixing of the fuel and oxidizer. The fuel and oxidizer then can generate sufficient force to break a third diaphragm disposed toward the exterior of the microthruster, thereby allowing the propellant exhaust gas to be ejected from the microthruster cell.

In one illustrative embodiment, the first set of cavities is formed upon a silicon substrate. The silicon substrate may have supporting electronics formed in the top surface thereof. A silicon dioxide layer may then be grown on the top of the wafer and supporting electronics. To produce a suspended igniter element, a cavity may be etched into the silicon dioxide layer, and filled with a polymer or other sacrificial layer. A silicon nitride layer or the like may then be deposited over the silicon dioxide and sacrificial layer, and an electrically resistive layer may be put on top of the silicon nitride. The sacrificial layer may then be removed, leaving a suspended igniter structure. The igniter element is preferably a heatable metal resistor coated or otherwise coupled to an explosive compound.

In a preferred embodiment, the first cavity is filled with a thermal insulator, such as a vacuum. The first set of cavities can have a first diaphragm forming the ceiling of a cavity, which, in one embodiment, is formed of silicon nitride. The second set of the cavities can be formed on top of the silicon nitride diaphragm, and may have walls formed of silicon dioxide. In one embodiment, the top of the second cavity is open, and serves as an opening through which an explosive compound is packed into the second cavity. In another embodiment, a plastic explosive is poured into the second cavity through the top orifice and cured. In yet another embodiment, the second set of cavities is further capped by yet another silicon nitride diaphragm.

In one microthruster embodiment, the second cavity has a ceiling or second diaphragm separating the second cavity from a third cavity, or, alternatively, dividing the second cavity into a first portion and a second portion. In this arrangement, the first portion may be filled with a fuel and the second portion may be filled with an oxidizer. The explosion of the igniter can break both the first diaphragm and the second diaphragm, thereby allowing mixing of the fuel and oxidizer, which causes rapid expansion of the propellant formed by the combined oxidizer and fuel. In one embodiment, the top of the third cavity is capped by a silicon nitride third diaphragm.

DETAILED DESCRIPTION OF THE PREFERRED EMBODIMENTS

Figure 1:
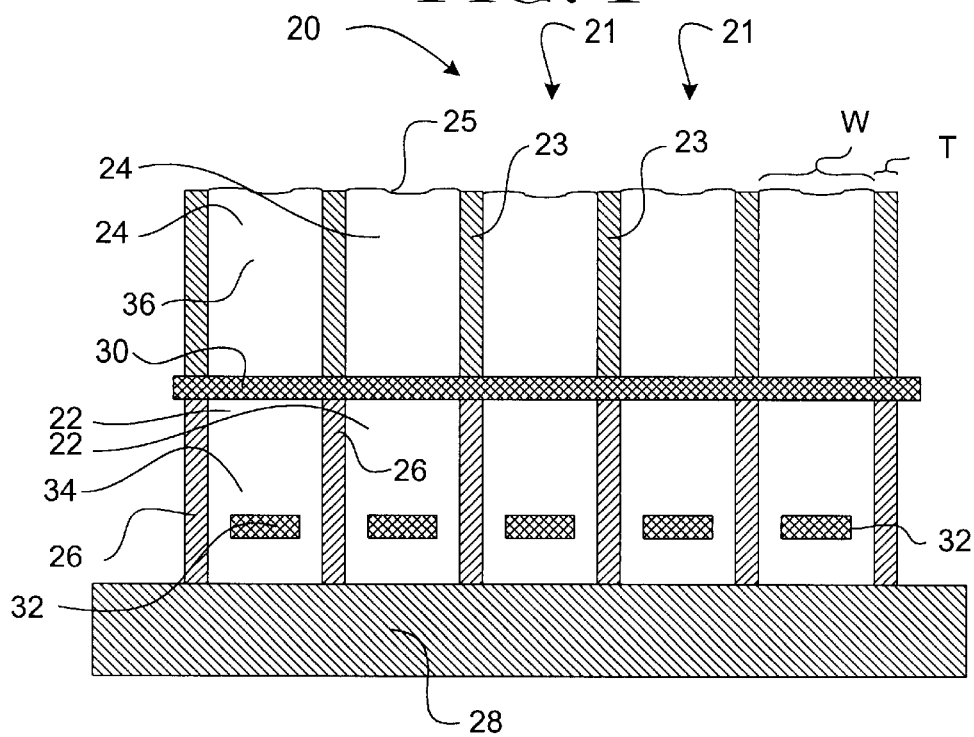
FIG. 1 is a highly diagrammatic, transverse, cross-sectional view of a set of first cavities or chambers having a suspended igniter within, and a second set of cavities or chambers having propellant within, separated from the first cavities by a first, breakable diaphragm.

FIG. 1 illustrates a microthruster array 20 formed of numerous microthruster propulsion cells 21, each having a set of first microthruster chamber or cavity 22 disposed beneath a second microthruster chamber or cavity 24. First microthruster chambers 22, in the embodiment illustrated, are defined by a set of first walls 26 which sit on top of a first floor or bottom wafer 28. First cavity or chamber 22 also includes a suspended explosive igniter 32.

In the embodiment illustrated, explosive igniter 32 is suspended, and disposed away from first floor wafer 28. This helps thermally isolate the explosive igniter from wafer 28. As illustrated in FIG. 1, explosive igniter 32 is preferably surrounded on a majority of its exterior surface by a thermal insulator 34, such as a vacuum. The vacuum inhibits the dissipation of heat away from the explosive igniter, thereby allowing a faster build-up of heat within the igniter, and preventing the unwanted heating of adjacent propulsion cells.

A first diaphragm 30 forms a. top, or ceiling, of first cavity or chamber 22. First diaphragm 30 is designed to be broken by the explosion of explosive igniter 32. Second chambers 24 can be defined at the bottom by first diaphragm 30, and on the side by a second set of walls 23. Second chambers 24 are preferably substantially filled with a propellant. Second chambers 24 have an exterior orifice 25, which may also be referred to as an exhaust orifice. In a preferred embodiment, second cavities 24 are filled with a propellant mixture 36. Propellant mixture 36 is selected to be ignited by the explosion of explosive igniter 32 and the breakage of first diaphragm 30. Upon the rapid expansion of propellant mixture 36, exhaust propellant gases expand through exhaust opening or orifice 25.

Wafer 28 may include a silicon wafer which is used as a substrate. The silicon substrate may have supporting electronics formed in the top surface thereof. A silicon dioxide layer may then be grown on the top of the silicon wafer. To produce a suspended igniter element, a cavity may be etched into the silicon dioxide layer, and filled with a poly or other sacrificial layer. A silicon nitride layer or the like may then be grown over the silicon dioxide and sacrificial layer. The sacrificial layer may then be removed, leaving a suspended igniter structure as shown in FIG. 1. Other methods for forming a suspended igniter element are described in U.S. Pat. Nos. 6,046,485, and 5,600,148.

Explosive igniters 32 preferably includes a resistive metal or filament, which heats upon the application of current. In one embodiment, hafnium nitride is used to form the filament. The filament may be coated or otherwise coupled to an explosive material, such as a lead styphnate explosive, which explodes upon obtaining a sufficiently high temperature.

First cavity walls 26 are preferably formed of silicon dioxide, and are preferably about 10 microns thick, indicated by "T" in FIG. 1. First cavities 22, in one embodiment, are disposed on a center-to-center pitch of about 51 microns and have a width of about 41 microns, indicated by "W" in FIG. 1. In one embodiment, second diaphragm 30 is formed of silicon nitride and is about 400 Angstroms thick. Second cavities or chambers 24 may have walls 23 formed of structural silicon, which may have a thickness of about 10 microns in some embodiments. In a preferred embodiment, the pitch of second cavities 24 is the same as the pitch of first cavities 22 over which the second cavities are coaxially disposed.

Second cavities 36 are preferably filled with a plastic explosive such as nitrocellulose acetate. As illustrated in FIG. 1, microthruster array 20 has generally a base plane or surface as defined by base wafer 28, and an exhaust plane or surface, as defined by the tops of the second cavity walls 23. In use, the exhaust gas from second cavities 24 generally is exhausted orthogonally to the exhaust plane along an exhaust axis.

Figure 2:
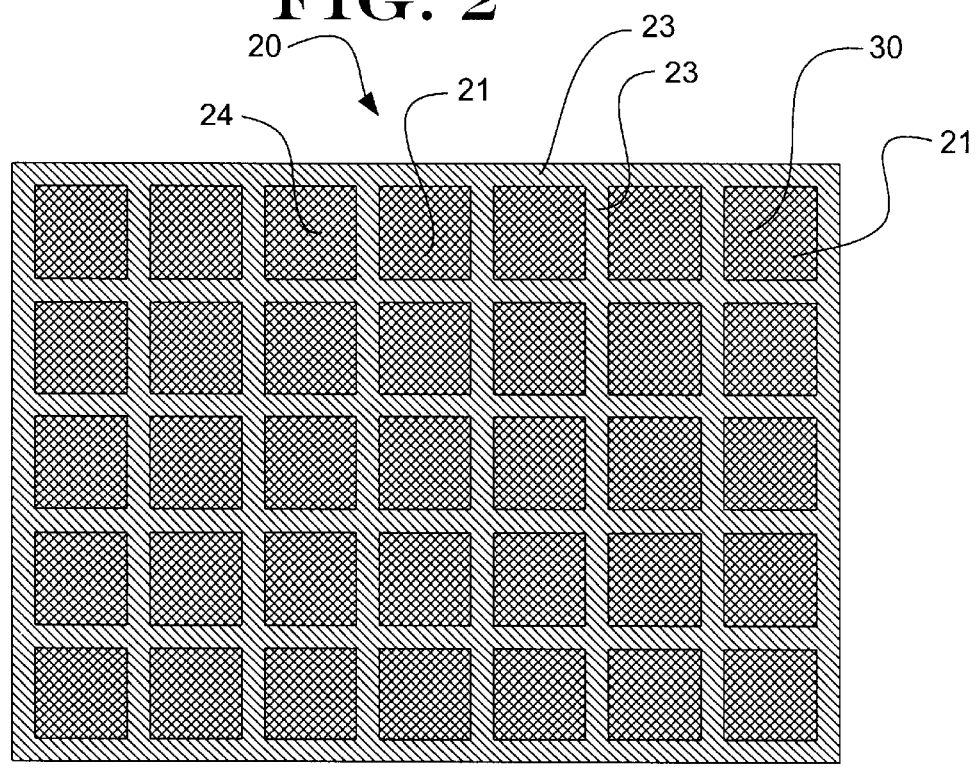
FIG. 2 is a top view of the second cavities of FIG. 1.

Referring now to FIG. 2, microthruster array 20 is illustrated from a top view, illustrating microthruster cells 21 including second cavity walls 23 defining second cavities 24 therebetween, and having breakable first diaphragm 30 forming the floor of second cavities 24.

Figure 3:
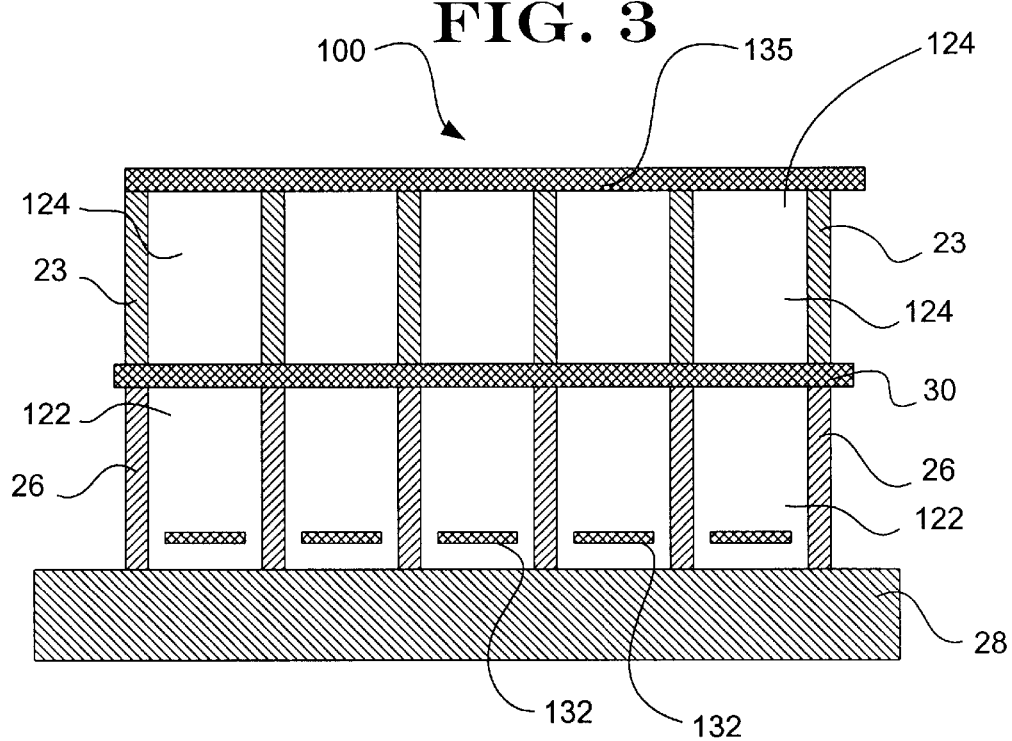
FIG. 3 is a highly diagrammatic, transverse, cross-sectional view of a microthruster array having a set of first microthruster chambers separated from a set of second microthruster chambers by a first diaphragm, being further capped by a second diaphragm.

Referring now to FIG. 3, another embodiment of the invention is illustrated in a microthruster device 100. Microthruster device 100 is similar in some respects to microthruster device 20 illustrated in FIGS. 1–2, wherein similarly number elements are as previously described. In this embodiment, first cavities or chamber 122 have an explosive igniter 132 largely suspended away from wafer 28. The second cavities 124 have a second diaphragm 135 disposed thereover. Second diaphragm 135 is formed of silicon nitride in some embodiments.

Figure 4:
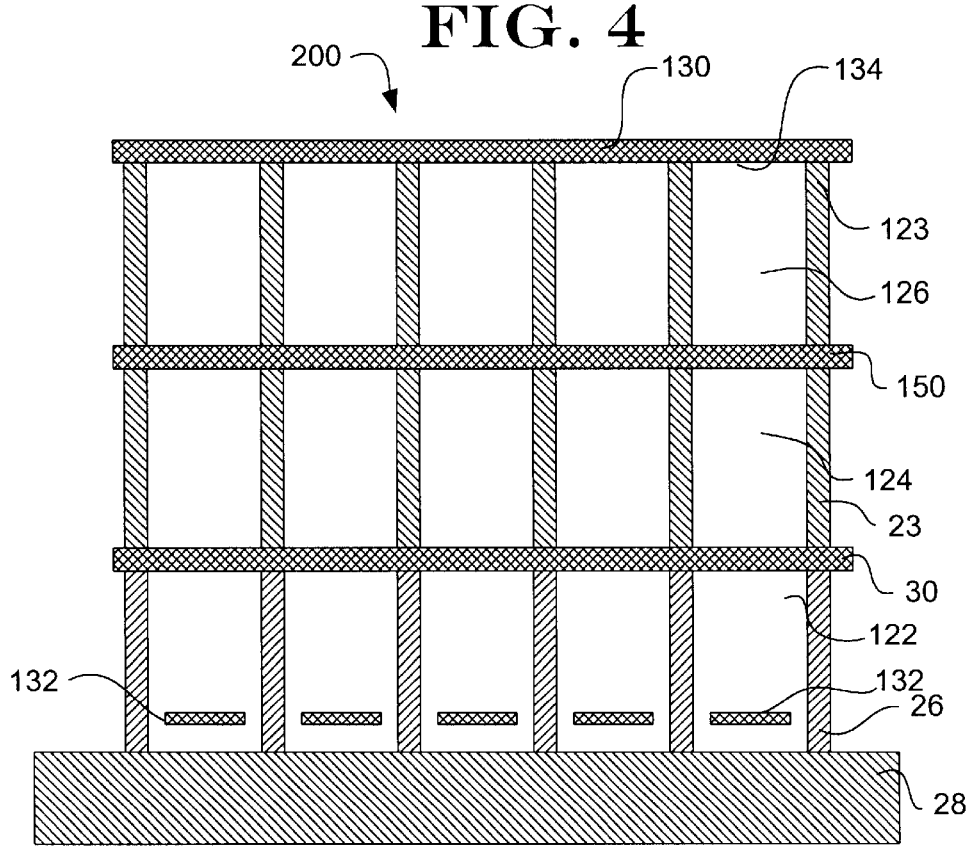
FIG. 4 is a highly diagrammatic, transverse, cross-sectional view of a microthruster array having a first set of igniter chambers disposed beneath a second fuel or oxidizer chamber separated from a third fuel or oxidizer chamber by a second diaphragm.

Referring now to FIG. 4, a microthruster device 200 is illustrated. Microthruster device 200 includes three layers of stacked or coaxially aligned propellant chambers or cavities. Microthruster device 200 includes a set of first propulsion chambers or cavities 122 defined between base wafer 28 and first diaphragm 30. Second propulsion chambers or cavities 124 are defined between first diaphragm 30 and a second diaphragm 150 and are disposed between cavity walls 23. A third set of propulsion chambers or cavities 126 is defined on the sides by a third set of cavity walls 123 and on the bottom by second diaphragm 150. The third cavities 126 may have a top or exhaust face or orifice 134 for exhausting propellant gases. A third diaphragm 130 may cap the third propulsion chambers 126, if desired.

The second cavities 124 may be filled with a fuel and the third cavities 126 may be filled with an oxidizer, or visa-versa. Together, the fuel and oxidizer may be considered a propellant. In yet another view of the invention, second cavities 124 and third cavities 126 together form a single cavity having a first portion 124 and a second portion 126, separated therebetween by second diaphragm 150.

In some embodiments of the invention, second cavities 124 are filled sufficiently full of material to guarantee that the detonation of explosive igniter 132 will cause breakage of both first diaphragm 30 and second diaphragm 150, but not immediately breaking third diaphragm 130. After mixing of fuel and oxidizer caused by the breakage of second diaphragm 150, sufficient energy is generated to break third diaphragm 130. In some embodiments, a smaller amount of void or gas space is left within second cavity 124, relative to the void or gas space within third cavity 126. In particular, second cavity 124 may have a sufficiently small void or gas space so as to insure that the transmission of the shock wave from detonated of explosive igniter 132 breaks through the second diaphragm 150, while the third cavity 126 has a substantial amount of void or gas space to at least momentarily contain the shock wave caused by explosive igniter 132. More specifically, the explosive shock wave caused by the detonation of explosive igniter 132 may break through first diaphragm 30 and second diaphragm 150, but may be absorbed by third cavity 126, acting as a shock absorber, thereby delaying the breakage of outer diaphragm 130.

Figure 5:
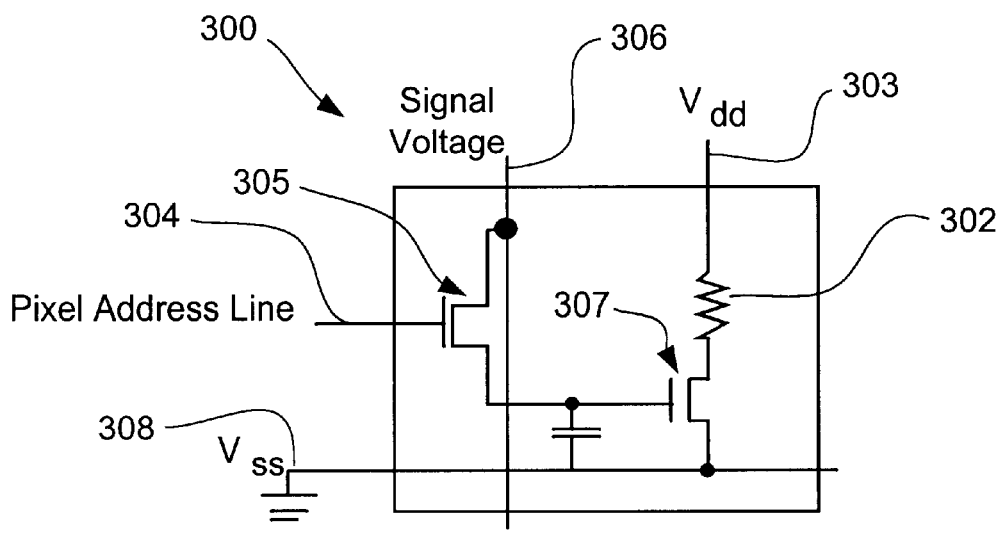
FIG. 5 is an electrical schematic of one igniter circuit suitable for use in the present invention.

Referring now to FIG. 5, an electrical circuit 300 is illustrated, suitable for forming the addressing and igniting electronics for explosive igniter 33, as previously discussed. Electrical circuit 300 includes an emitter resistor 302 for heating an explosive material to the point of explosion. Circuit 300 also has an address line 304, a signal line 306, a Vdd line 303, and a Vss line 308. The address line 304 may be used to select a particular row, and the signal line 306 may be used to select a particular column within an array of micro-thrusters cells. Referring specifically to FIG. 5, when the signal line 306 and the address line 304 are both high, transistor 305 is activated, pulling the gate of drive transistor 307 high. This turns on drive transistor 307, which pulls current though emitter resistor 302, This current heats the emitter resistor, causing the explosive igniter to explode, as described above.

Figure 6:
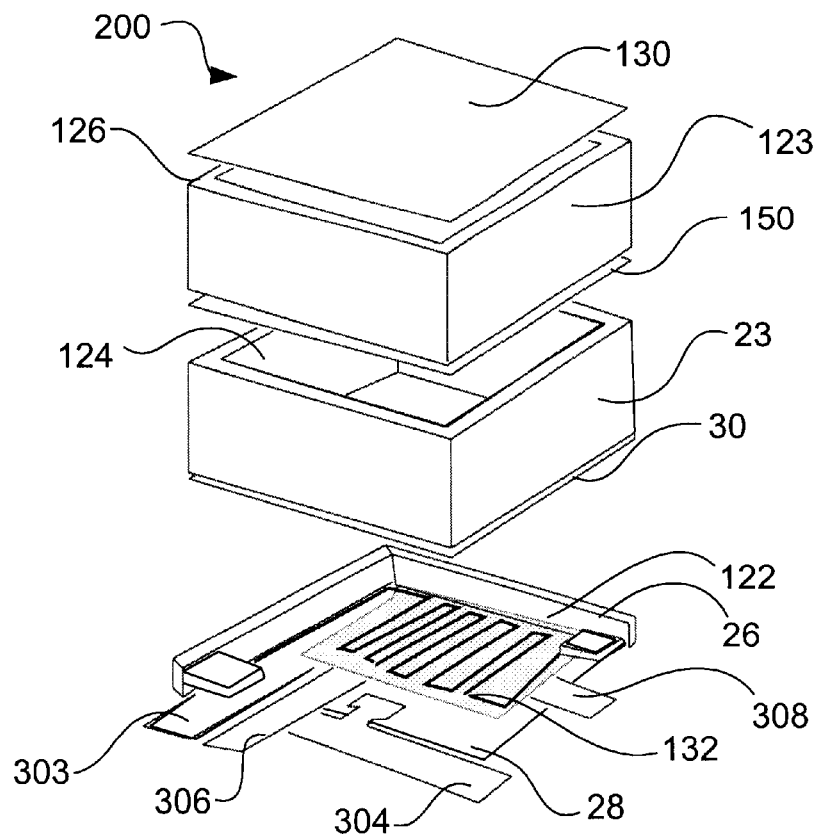
FIG. 6 is an exploded, perspective view of a microthruster array according to the present invention.

Referring now to FIG. 6, microthruster device 200 of FIG. 4 is illustrated in an exploded, perspective view. The illustrative microthruster device 200 is formed upon substrate wafer 28. A silicon dioxide layer is grown on the substrate wafer 28. Cavities 122 are then etched into the silicon dioxide layer, to form first cavity walls 26. Explosive igniter 132 is preferably suspended above the floor of the first cavities 122, and may have a serpentine form, as previously described. Signal line 306 and pixel address line 304 may be used to active the explosive igniter 132, as previously described in FIG. 5.

Explosive igniter 132 is preferably formed of a serpentine-shaped resistor that is encapsulated in a sheet of silicon nitride. The combined resistor and encapsulating material may form a planar surface, and explosive materials such as lead styphnate may lie atop or below the resistor surface, awaiting heating to the point of explosion. First silicon nitride diaphragm 30, which may be separately formed, may be affixed to the top surface of the first cavity walls 26. Second cavity walls 23 extend upward from the first silicon nitride diaphragm 30. In a preferred embodiment, first diaphragm 30 and second cavity walls 23 are formed together, and later added, atop first cavity walls 26. Second diaphragm 150 may also be seen, having been previously affixed beneath a third cavity wall 123, which defines third cavity 126 within. Disposed atop third cavity 126 is a third diaphragm 130.

Conventional semiconductor manufacturing techniques may be used to make microthrusters according to the present invention in general, and microthruster propulsion cell 200 in particular. In one method of manufacturing, the illustrative microthruster device 200 is formed upon substrate wafer 28. A silicon dioxide layer is grown on the substrate wafer 28. Cavities 122 are then etched into the silicon dioxide layer, to form first cavity walls 26. Explosive igniter 132 is preferably suspended above the floor of the first cavities 122, and may have a serpentine form, as previously described.

Second cavity 124 may be formed by beginning with another wafer of structural silicon, and forming a layer of silicon nitride thereover. Conventional semiconductor manufacturing techniques may then be used to etch through the structural silicon from the back side of the wafer to the silicon nitride layer. This forms the second cavity 124, bounded on the bottom by the silicon nitride diaphragm. A layer of aluminum may be provided before the silicon nitride layer to serve as an etch stop in the formation of the second cavity 124 through the structural silicon. Once formed, the substrate with the second cavities may be bonded to the top surface of the first cavity walls 26, preferably using a solder or other bonding mechanism. Similar methods may be used in the manufacture of the third cavity.

In operation, the appropriate pixel may be addressed, and sufficient voltage applied, to heat the explosive igniter. The explosive igniter preferably heats to a temperature sufficient to ignite and explode the adjacent explosive material. In a preferred embodiment, the explosive igniter is surrounded on a majority of its surface by vacuum, thereby inhibiting the dissipation of heat as the heat is built up to the point of explosion. In one embodiment, the resistor emitter is heated to a temperature of about 290° C., at which point the adjacent lead styphnate explodes. A lead styphnate explosion can break the first diaphragm 30, as well as the second diaphragm 150, in embodiments having a second diaphragm. In this initial time period, third diaphragm 130 may be left unbroken.

The mixture of propellant components such as fuel and oxidizer within first cavity 124 and second cavity 126, coupled together with the explosion of explosive igniter 132, may serve to ignite the propellant, thereby causing the rapid expansion of propellant into exhaust gas, which breaks through third diaphragm 130. In one embodiment utilizing plastic explosive, the plastic explosive has a rapid propagation for shock wave through the fuel, yet the burn rate of the fuel is relatively slow. The material is preferably selected such that the shock front propagates through the propellant more quickly than the burn products are created and expelled. In a preferred embodiment, the entire volume of heated propellant in a cavity is converted to gas instantaneously and is expelled as a gas. As previously discussed, adjacent cavities are preferably left untouched and available for future use.

One illustrative embodiment includes one quarter million (250,000) thrusters on a 1.3-inch by 1.3-inch silicon die. The thrusters themselves may be laid out on a series of 512 by 512 cell grids, each having a 51-micrometer by 51-micrometer pitch. Each thruster may have its own heater element, which can be coaxially aligned with a hollow, propellant filled cavity directly above it. The filaments are preferably built monolithically on top of space-qualified radiation hard electronics, such as Honeywell's RICMOS® electronics, such that each thruster is individually addressable and ignitable.

A preferred embodiment of the invention utilizes a small, for example one microgram, charge of thermally detonatable lead styphnate which explodes when heated to an auto ignition temperature of about 270° C. The lead styphnate preferably explodes, releasing a great deal of energy, but not a great deal of usable momentum. In the second stage of the reaction, the exploding lead styphnate breaks through the first diaphragm and ignites a nitrocellulose mixture in the second cavity, as previously described.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A microthruster having a plurality of propulsion cells, wherein each of the propulsion cells comprise:
   a first cavity;
   an explosive igniter disposed within said first cavity;
   a second cavity separated from said first cavity by a first diaphragm,
   wherein said first diaphragm is cooperatively dimensioned with said igniter to break upon the explosion of said explosive igniter; and
   a propellant disposed in said second cavity, said propellant selected to expand rapidly in response to said igniter exploding through said broken first diaphragm.

2. A microthruster as in claim 1, wherein said explosive igniter disposed within said first cavity is disposed within a thermal insulator.

3. A microthruster as in claim 2, wherein said thermal insulator is a vacuum.

4. A microthruster as in claim 1, wherein said explosive igniters are individually selectable and ignitable.

5. A microthruster as in claim 1, wherein said first cavity is defined at least in part by materials selected from the group consisting of silicon, silicon dioxide, and silicon nitride.

6. A microthruster as in claim 1, wherein said first cavity is defined at least in part by silicon dioxide walls and said first diaphragm is formed of silicon nitride.

7. A microthruster as in claim 1, wherein said explosive igniter includes a resistive heater coupled to an explosive material.

8. A microthruster as in claim 1, wherein said first cavity has a floor and said explosive igniter is suspended between said first cavity floor and said first diaphragm.

9. A microthruster as in claim 1, wherein said propellant is selected from the group consisting of plastic explosives, nitrocellulose, and nitrocellulose acetate.

10. A microthruster as in claim 1, wherein said second cavity includes a second diaphragm dividing said second cavity into a first portion and a second portion, wherein said first portion is disposed between said first and second diaphragm, and said second portion is disposed on an opposing side of said second diaphragm from said first portion.

11. A microthruster as in claim 10, wherein one of said second cavity first and second portions contains a propellant fuel, and wherein the other of said second cavity first and second portions contains a propellant oxidizer, wherein said second diaphragm is breakable upon the explosive ignition of said explosive igniter.

12. A rocket motor as in claim 1, wherein said cells are disposed in an array, wherein said first cavities are separated by first cavity walls, and wherein said explosive igniters are sufficiently thermally insulated from adjacent cells such that igniting a first cell does not ignite propellant in an adjacent cell.

13. A microthruster cell having an interior surface, an exterior exhaust surface and an exhaust axis substantially orthogonal to said exterior exhaust surface, said microthruster cell comprising:
   an explosive ignition chamber having chamber walls and a floor, said floor being disposed toward said interior surface, said chamber walls being oriented substantially parallel to said exhaust axis;
   an explosive igniter disposed within said explosive ignition chamber, said explosive igniter being ignitable by an externally supplied signal;
   a propellant chamber oriented coaxially with said explosive ignition chamber, said propellant chamber having propellant chamber walls oriented substantially parallel to said exhaust axis, said propellant chamber containing a propellant material and having an exhaust orifice disposed toward said exterior exhaust surface; and
   a first diaphragm disposed between said explosive ignition chamber and said propellant chamber, said first diaphragm being cooperatively dimensioned with said explosive igniter to break upon the explosion of said explosive igniter.

14. A microthruster cell as in claim 13, wherein said propellant exhaust orifice is capped by an exhaust diaphragm adapted to break upon ignition of said propellant in said propellant chamber.

15. A microthruster cell as in claim 13, wherein said propellant chamber has a single, undivided interior.

16. A microthruster cell as in claim 13, wherein said propellant chamber has at least a first portion and a second portion, wherein said first portion is separated from said second portion by an internal propellant diaphragm adapted to break upon the explosion of said explosive igniter.

17. A microthruster cell as in claim 13, wherein said explosive igniter is disposed within a thermal insulator within said explosive ignition chamber.

18. A microthruster cell as in claim 17, wherein said thermal insulator is a vacuum.

19. A microthruster cell as in claim 13, wherein said explosive ignition chamber is sufficiently insulated to preclude unwanted ignition of adjacent explosive ignition chambers.

20. A microthruster cell comprising:
   a first cavity;
   an explosive igniter at least partially suspended within said first cavity;
   a second cavity separated from said first cavity by a first diaphragm,
   wherein said first diaphragm is cooperatively dimensioned with said igniter to break upon the explosion of said explosive igniter; and
   a propellant disposed in said second cavity, said propellant selected to expand rapidly in response to said igniter exploding through said broken first diaphragm.

* * * * *